(12) United States Patent
Idsøe

(10) Patent No.: US 8,928,455 B2
(45) Date of Patent: *Jan. 6, 2015

(54) KEY FOB WITH PROTECTED BIOMETRIC SENSOR

(71) Applicant: Tore Etholm Idsøe, Nesøya (NO)

(72) Inventor: Tore Etholm Idsøe, Nesøya (NO)

(*) Notice: Subject to any disclaimer, the term of this patent is extended or adjusted under 35 U.S.C. 154(b) by 0 days.

This patent is subject to a terminal disclaimer.

(21) Appl. No.: 14/052,992

(22) Filed: Oct. 14, 2013

(65) Prior Publication Data

US 2014/0043138 A1 Feb. 13, 2014

Related U.S. Application Data

(63) Continuation of application No. 13/030,829, filed on Feb. 18, 2011, now Pat. No. 8,598,981.

(51) Int. Cl.
| | | |
|---|---|---|
| G05B 19/00 | (2006.01) | |
| G06K 9/00 | (2006.01) | |
| G06K 7/10 | (2006.01) | |
| H04M 1/66 | (2006.01) | |
| G07C 9/00 | (2006.01) | |
| G06F 21/32 | (2013.01) | |
| G06F 21/35 | (2013.01) | |
| G06F 21/83 | (2013.01) | |
| H04L 9/32 | (2006.01) | |

(52) U.S. Cl.
CPC ............ *G07C 9/00158* (2013.01); *G06F 21/32* (2013.01); *G06F 21/35* (2013.01); *G06F 21/83* (2013.01); *G07C 9/00563* (2013.01); *G07C 9/00944* (2013.01); *H04L 9/3231* (2013.01); *H04L 9/3234* (2013.01); *G07C 2009/00095* (2013.01); *H04L 2209/805* (2013.01); *G06F 2221/2153* (2013.01)

USPC ......... 340/5.53; 340/5.83; 340/5.4; 340/5.61; 340/5.42; 382/126; 382/124; 382/115; 382/116; 455/411; 455/410; 235/462.43; 235/454

(58) Field of Classification Search
USPC ............. 340/5.52–5.53, 5.4–5.42, 5.61, 5.83; 341/176; 455/575.4; 726/19–20
See application file for complete search history.

(56) References Cited

U.S. PATENT DOCUMENTS

D343,952 S 2/1994 MacDonald
5,529,581 A * 6/1996 Cusack .......................... 606/181

(Continued)

FOREIGN PATENT DOCUMENTS

CN 201372614 Y 12/2009
DE 10047639 A1 10/2001

(Continued)

OTHER PUBLICATIONS

BioFob™ Security Device, Wireless Biometric Security product information, Sargent Assa Abloy, © 2008 Sargent Manufacturing, 2 pages (reprinted Feb. 25, 2008 from www.sargentlock.com/solutions/biofob/).

(Continued)

*Primary Examiner* — Fekadeselassie Girma
(74) *Attorney, Agent, or Firm* — Duane Morris LLP

(57) ABSTRACT

A key fob includes a biometric sensor including a fingerprint area sensor having a surface for receiving a finger, and a controller includes at least one processor configured to authenticate a user of the key fob based on biometric information obtained with the biometric sensor and stored biometric information for an individual. The key fob includes a RF transmitter for communicating stored transaction information to a reader upon authentication of the user and a housing. The housing includes a base for supporting the biometric sensor and a cover sleeve slidably engaged with the base to allow for extension from and retraction into the sleeve by the base, thereby permitting selective exposure of the fingerprint area sensor under user actuation.

20 Claims, 15 Drawing Sheets

(56) References Cited

U.S. PATENT DOCUMENTS

| | | | |
|---|---|---|---|
| 5,531,300 A * | 7/1996 | Tsai | 190/115 |
| D380,895 S | 7/1997 | Tsui | |
| 6,091,837 A | 7/2000 | Dinh | |
| 6,164,403 A | 12/2000 | Wuidart | |
| D458,017 S | 6/2002 | Yehudai | |
| D461,047 S | 8/2002 | Peterson | |
| 6,710,700 B1 | 3/2004 | Tatsukawa et al. | |
| D495,132 S | 8/2004 | Cormier et al. | |
| 6,848,052 B2 | 1/2005 | Hamid et al. | |
| D511,114 S | 11/2005 | Feldman et al. | |
| 6,970,584 B2 * | 11/2005 | O'Gorman et al. | 382/126 |
| 7,155,416 B2 | 12/2006 | Shatford | |
| D541,040 S | 4/2007 | Cui | |
| D542,025 S | 5/2007 | Vincent | |
| 7,239,227 B1 | 7/2007 | Gupta et al. | |
| 7,248,201 B2 * | 7/2007 | Buccinna et al. | 341/176 |
| D554,362 S | 11/2007 | Bates et al. | |
| D554,363 S | 11/2007 | Bates et al. | |
| D598,193 S | 8/2009 | Miles et al. | |
| D601,609 S | 10/2009 | Kripalani | |
| 7,806,705 B2 | 10/2010 | Yu et al. | |
| D636,986 S * | 5/2011 | Idsoe | D3/208 |
| 8,043,318 B2 * | 10/2011 | Schraga | 606/182 |
| 8,255,697 B2 | 8/2012 | Mathiassen et al. | |
| 8,352,041 B2 | 1/2013 | Das et al. | |
| 8,352,042 B2 | 1/2013 | Das et al. | |
| 8,423,097 B2 | 4/2013 | Takagi | |
| 8,598,981 B2 * | 12/2013 | Idsoe | 340/5.53 |
| 2002/0109580 A1 | 8/2002 | Shreve et al. | |
| 2002/0154796 A1 | 10/2002 | Helot et al. | |
| 2003/0200778 A1 | 10/2003 | Chhatwal | |
| 2005/0137977 A1 * | 6/2005 | Wankmueller | 705/40 |
| 2005/0215298 A1 * | 9/2005 | Lee | 455/575.4 |
| 2006/0213982 A1 | 9/2006 | Cannon et al. | |
| 2007/0176437 A1 | 8/2007 | Marschalek et al. | |
| 2007/0214848 A1 | 9/2007 | Meyerle et al. | |
| 2008/0063246 A1 | 3/2008 | Dinh | |
| 2008/0217398 A1 * | 9/2008 | Woo | 235/380 |
| 2008/0229409 A1 * | 9/2008 | Miller et al. | 726/19 |
| 2010/0090801 A1 * | 4/2010 | Wong et al. | 340/5.83 |

FOREIGN PATENT DOCUMENTS

| | | |
|---|---|---|
| DE | 202009016104 U1 | 3/2010 |
| EP | 0536578 A2 | 4/1993 |
| EP | 0926305 A1 | 6/1999 |
| EP | 1332925 A1 | 8/2003 |
| JP | D1136985 S | 2/2002 |
| JP | D1170565 S | 2/2003 |
| JP | D1365131 S | 6/2009 |
| TW | 127084 | 1/1990 |
| WO | WO2009/148196 A1 | 12/2009 |
| WO | WO2010053894 | 5/2010 |
| WO | WO2010053938 | 5/2010 |
| WO | WO2010080751 | 7/2010 |

OTHER PUBLICATIONS

MicroLatch™ product information, © 2008 Upek, Inc., 2 pages (reprinted May 5, 2009 from www.upek.com/industries/pages/micorlatch.asp).

"Integrated Smart Cards and Biometrics Market—The Next Level of Security," © 2005-2008 MicroLatch, 4 pages (reprinted Feb. 25, 2008 from www.microlatch.com/index.php?option=com_content&task=view%id=95&Itemid=27).

"Microlatch Opening Offices in UAE and India," © 2005-2008 MicroLatch, 4 pages (reprinted Feb. 25, 2008 from www.microlatch.com/index.php?option=com_content&task=view&id=94&Itemid=27).

Sargent® BioFob™ Security Device User Manual and Licensing Agreement Version 1.5, Sargent Manufacturing Company, © 2005 Privaris, Inc.

Notice of copending U.S. Appl. No. 29/338,039, filed Jun. 3, 2009.

Synochip AS602 Processor Datasheet; Synochip Co., Ltd. Revision 1.5, Apr. 2009, pp. 1-24.

STMicroelectronics STM32F103xC, STM32F103xD, STM32F103xE High-density performance line ARM-based 32-bit MCU with 256 to 512KB Flash, USB, CAN, 11 timers, 3 ADCs, 13 communication interfaces, Doc ID 14611 Rev 7, Sep. 2009, pp. 1-123 pages.

MasterCard Worldwide "MasterCard® PayPass™ Terminal Implementation Requirements," ©2007 MasterCard Worldwide Incorporated, 57 pages.

Corresponding PCT/182012/000282 search report and opinion dated Jun. 22, 2012.

Office Action issued on Aug. 11, 2014 in corresponding Chinese Patent Application No. 201280009538.8.

* cited by examiner

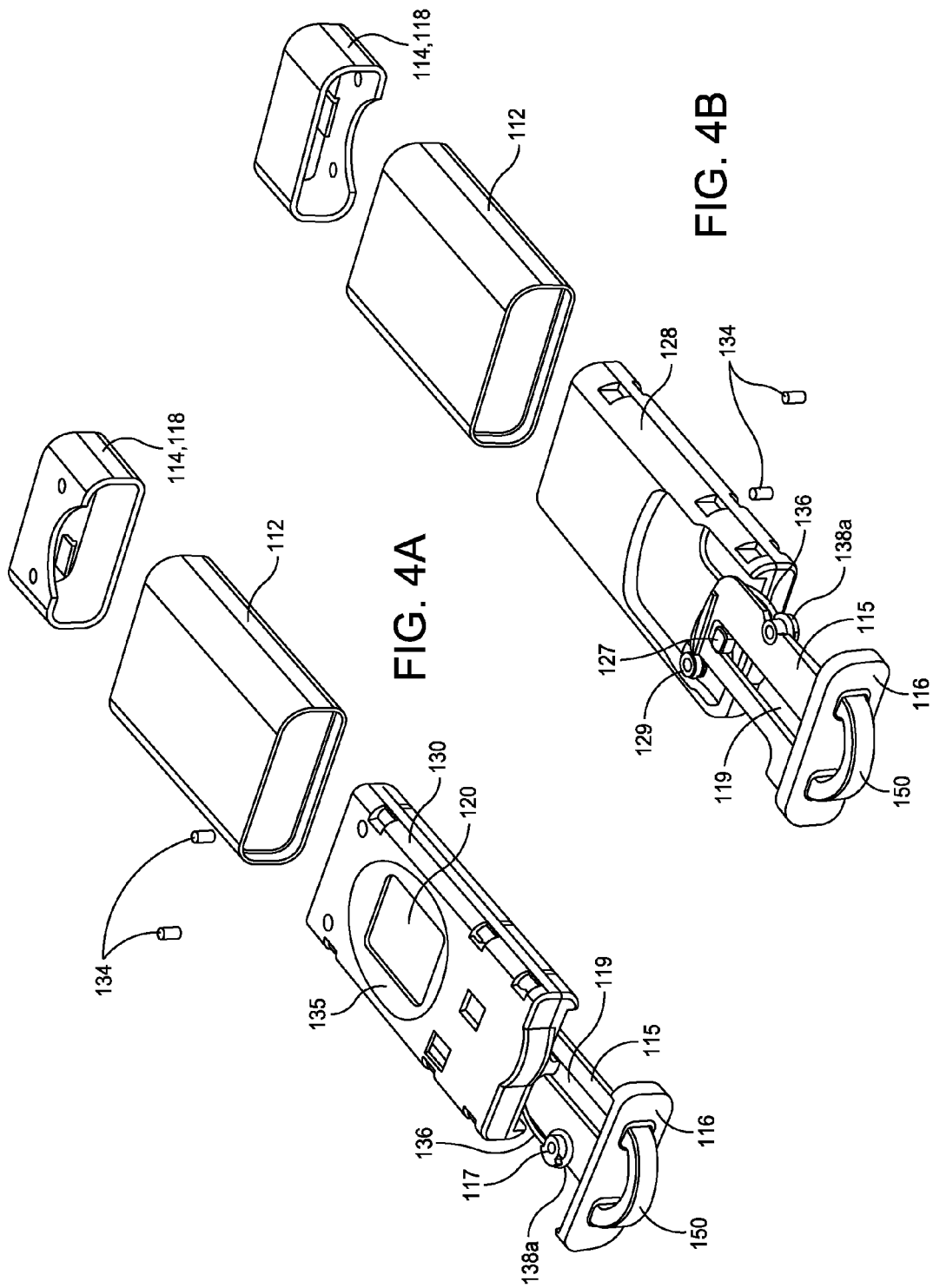

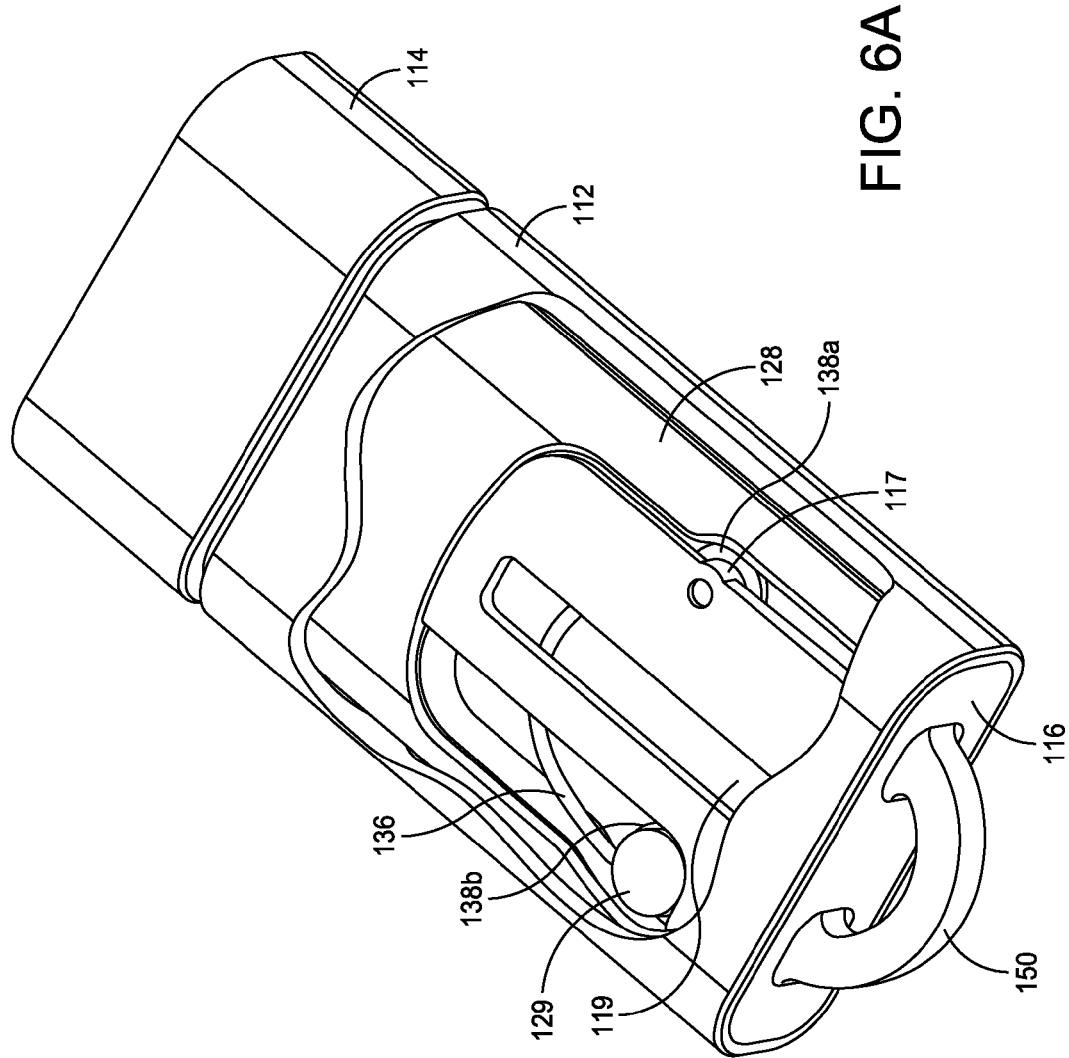

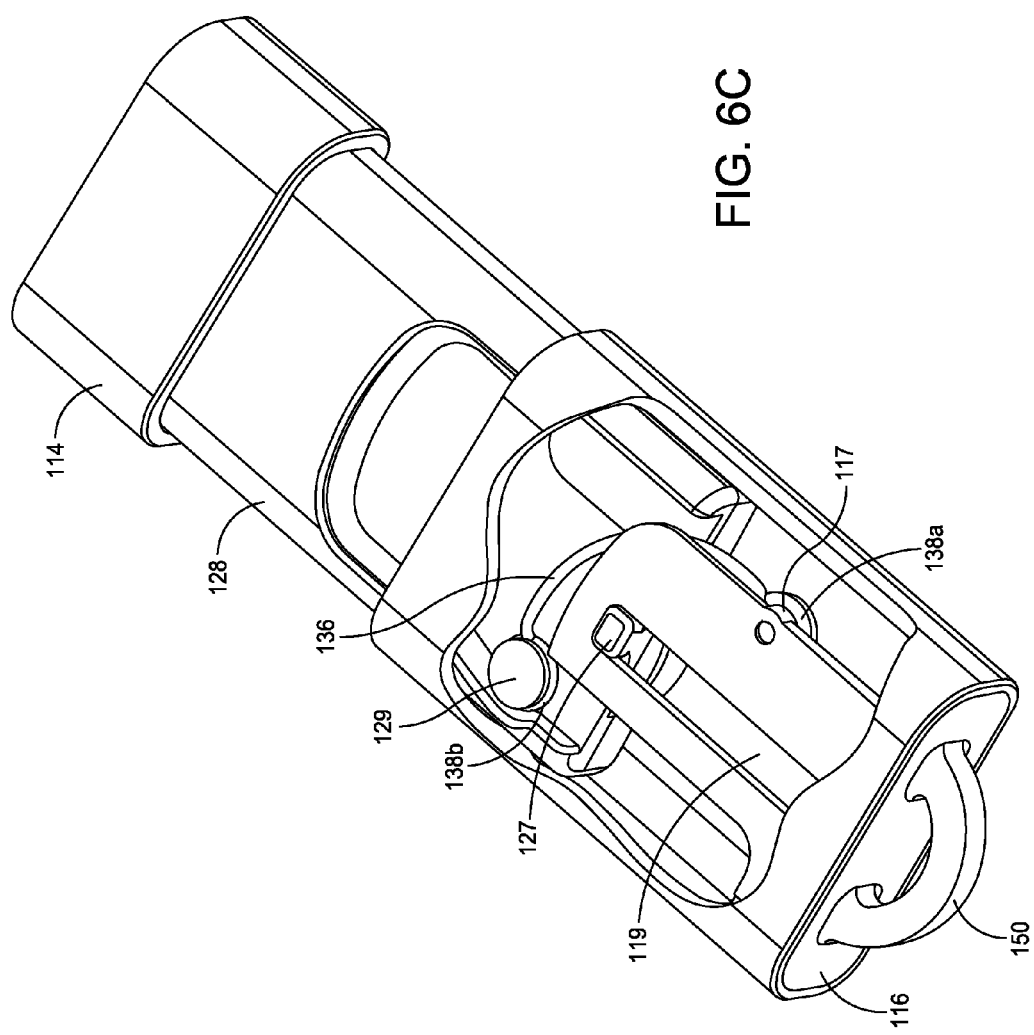

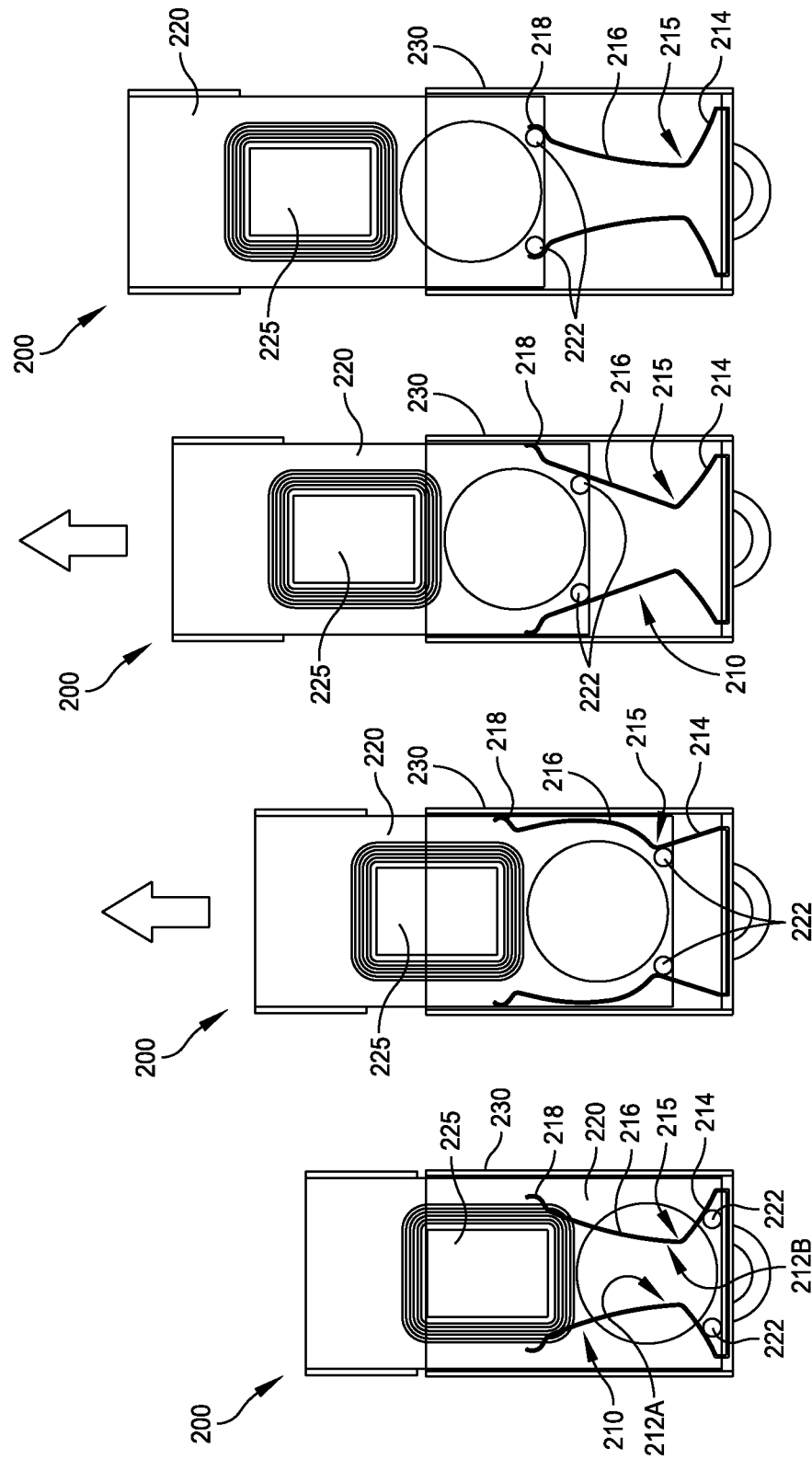

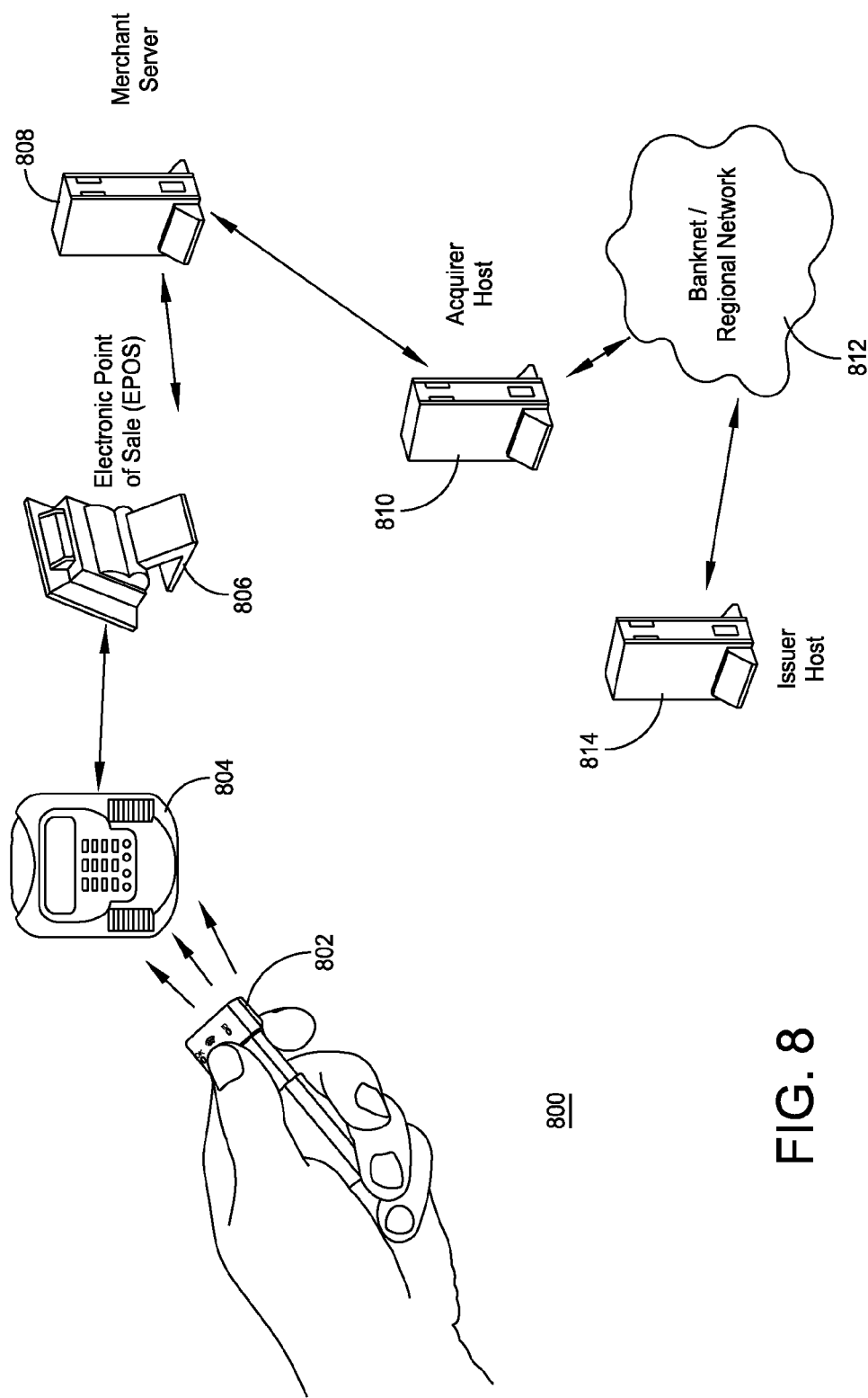

KEY FOB WITH PROTECTED BIOMETRIC SENSOR

CROSS-REFERENCE TO RELATED APPLICATIONS

The present application is a continuation of and claims priority to copending U.S. patent application Ser. No. 13/030,829, the entirety of which is hereby incorporated by reference herein.

FIELD OF THE INVENTION

The present invention relates to biometric authentication and access systems and devices.

BACKGROUND OF THE INVENTION

A key fob is a generally decorative and/or at times useful item people often carry with their keys, on a ring or a chain. Key fobs are often called "key rings" or "key chains" in colloquial usage. Fobs vary considerably in size, style and functionality. Most commonly they are simple discs of smooth metal or plastic, typically with a message or symbol such as that of a logo or a sign of an important group affiliation. A fob may be symbolic or strictly aesthetic, but it can also be a small tool. Many fobs are small flashlights, compasses, calculators, penknives, discount cards, bottle openers, and USB flash drives, to name a few. As electronic technology continues to become smaller and cheaper, miniature key-fob versions of (previously) larger devices are becoming common, such as digital photo frames and simple video games.

Electronic key fobs are used for activating such things as remote keyless entry systems on motor vehicles. Early electric key fobs operated using infrared and required a clear line-of-sight to function. More recent models use challenge-response authentication over radio frequency, making them harder to copy and eliminating the need for line-of-sight communication.

Key fobs are increasingly used in apartment buildings and condominium buildings for access to common areas (i.e., lobby doors, storage areas, fitness room, pool) and in office buildings. These types of fobs usually contain a passive RFID tag. The fob operates in much the same manner as a proximity card to communicate (via a reader pad) with a central server for the building, which can be programmed to allow access only to those areas in which the tenant or owner is permitted to access, or only within certain time frames.

Telecommuters may also use an electronic device in the form of a key fob that provides one part of a three way match to log in over an unsecure network connection to a secure network. This kind of key fob may have a keypad on which the user enters a PIN in order to retrieve an access code, or it could be a display-only device such as a VPN token that algorithmically generates security codes as part of a challenge/response authentication system.

Another example of a fob is the credit card fob, such as the PAYPASS® fob available from MasterCard International Inc. This type of fob uses a hidden embedded computer chip and radio frequency antennae. The user taps the fob at a special checkout terminal, and payment details (e.g., credit card number) are sent wirelessly from the fob to the terminal for use in the MasterCard network. The fob must be very close (in the order of inches) from the terminal in order to operate with the system.

While fobs for credit card applications have gained in popularity in recent years, there is still some resistance among consumers to using these types of fobs. One primary reason for this hesitancy is the perception that the fobs are not secure. For example, if one were to lose their keys, the fob could be used for purchases by another prior to reporting the fob as lost.

Therefore, improved, more secure fobs for use in secure transactions are desired.

SUMMARY OF THE INVENTION

A key fob includes a biometric sensor including a fingerprint area sensor having a surface for receiving a finger, and a controller includes at least one processor configured to authenticate a user of the key fob based on biometric information obtained with the biometric sensor and stored biometric information for an individual. The key fob includes a RF transmitter for communicating stored transaction information to a reader upon authentication of the user and a housing. The housing includes a base for supporting the biometric sensor and a cover sleeve slidably engaged with the base to allow for extension from and retraction into the sleeve by the base, thereby permitting selective exposure of the fingerprint area sensor under user actuation.

The above and other features of the present invention will be better understood from the following detailed description of the preferred embodiments of the invention that is provided in connection with the accompanying drawings.

BRIEF DESCRIPTION OF THE DRAWINGS

The accompanying drawings illustrate preferred embodiments of the invention, as well as other information pertinent to the disclosure, in which:

FIGS. 4A and 4B are top and bottom partial exploded assembly views of the key fob of FIG. 1;

FIGS. 6A-6D are partial cut away, perspective views of the key fob of FIG. 1 illustrating internal components thereof for use in extending and retracting the base of the key fob;

FIGS. 7A-7D illustrate an alternative embodiment of a key fob;

FIG. 8 illustrates a credit transaction system in which the key fob may be used;

DETAILED DESCRIPTION

Figure 1:
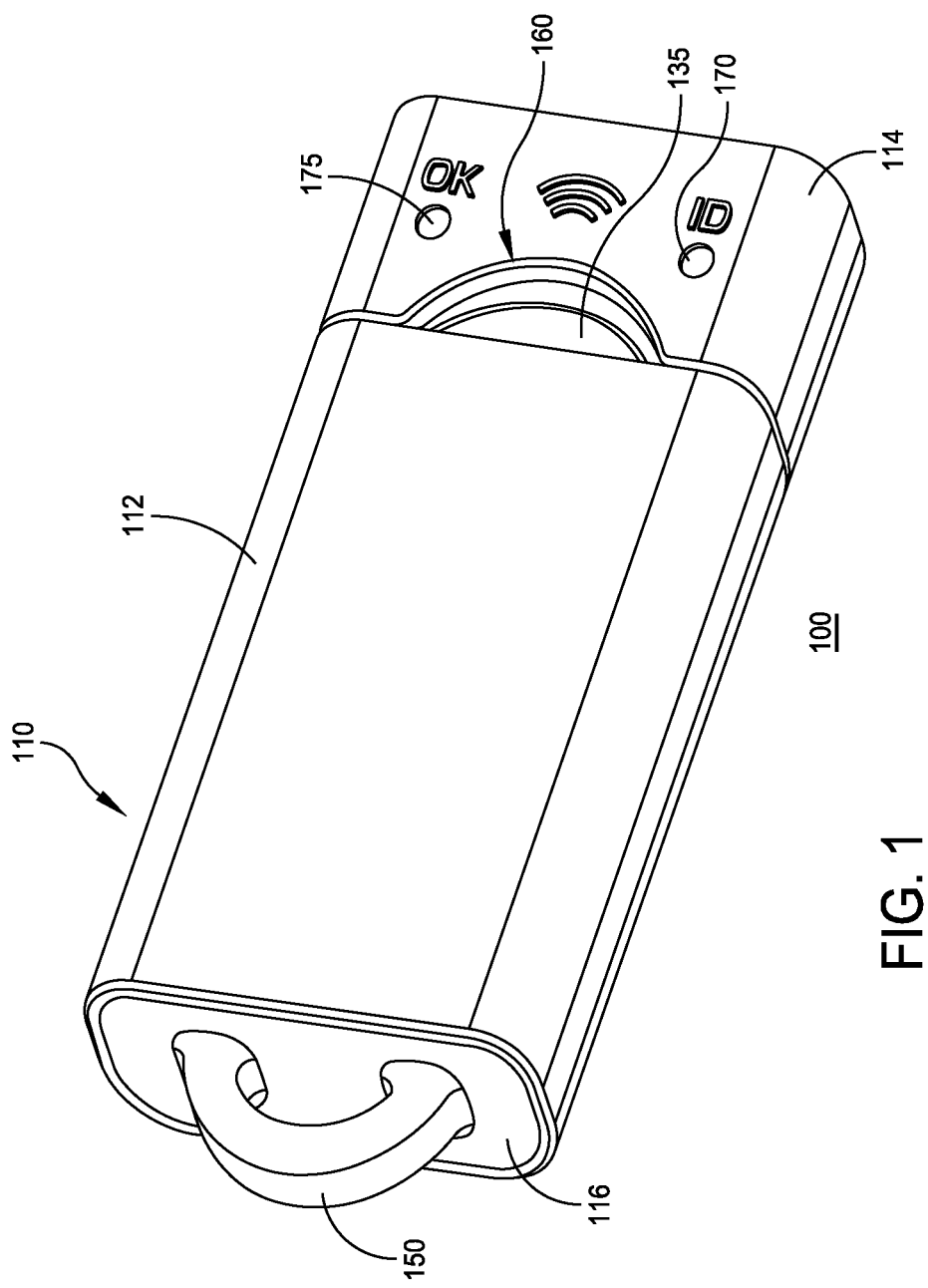
FIG. 1 is a front perspective view of a key fob with a biometric area sensor according to an embodiment of the present invention.

This description of the exemplary embodiments is intended to be read in connection with the accompanying drawings, which are to be considered part of the entire written description. In the description, relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

Due to the cost level of area format fingerprint sensors, biometric key fobs presently offered in the market use lower quality stripe format sensors. These fobs employ a small stripe format sensor, and the user swipes his/her finger across the sensor to create an image. The quality of the captured image of such sensors is poor, resulting in low solution security levels and poor user experience due to a high number of false rejections. Further, the motion of swiping a finger over a small format handheld device is difficult for some users. A user may need to hold the device with one hand while swiping with the other. As a result, some users can find using such a device clumsy and inconvenient.

Providing a key fob with an area sensor, rather than a small format swipe sensor, would avoid this awkward swiping action. However, implementing such a device with an area sensor introduce new challenges. These challenges are primarily related to the actual size of the sensor. Conventional wisdom is that implementing an area sensor in a key fob housing would increase the overall size of the device beyond what is acceptable to the end user. If the key fob device is too big or bulky, it will not be suited for its targeted use with key chains or with placement in the user's pockets.

Putting aside the size impediments to implementing an area sensor in a key fob, it is of particular importance that a personal mobile biometric authentication device, such as a biometric key fob, be not only small and pocket compatible but also at the same time facilitate fast and intuitive usage including a consistent and stable presentation of a significant portion of the user fingerprint. When not in operation the device should be small so as to not be bulky when attached to a user's key chain or placed in the user's pocket. A bulky design may be regarded as unattractive by a large percentage of the users, limiting the mass market appeal of such a product.

In direct conflict with the need for such a device to be small and inconspicuous, when in operation the device should be relatively long so as to facilitate ease of use by one hand manipulation. This increased length ensures a stable and comfortable platform for positioning in the user's hand when the device is in use, as well improves the probability of consistent and stable placement of the presented finger (e.g., thumb) over the sensor. If too short, then a user may need to hold the device with both hands, which would reduce the appeal of such a product.

When not in operation, the area sensor should also be physically protected, such as from articles like keys and coins in the user's pocket. The sensor, therefore, must be covered when not in use. But the process of opening or uncovering the sensor needs to be very fast and user intuitive.

The key fob disclosed herein uses an area sensor format rather than a small stripe format, which eliminates the need for an awkward swipe motion. The area sensor is housed in a key fob body that is easier to use than available swipe format sensors. Advantageously, the key fob housing is designed to have a small footprint when in a closed position and a larger or longer easy-to-use footprint when in an opened, operational position. The key fob can be opened quickly using a simple intuitive one-handed motion that conveniently positions the finger (e.g., thumb) in the proper location on the area sensor. This aspect of the key fob is quite unlike known swipe-sensor solutions which involve an awkward retracting finger swipe that is directed towards the user body.

Figure 2:
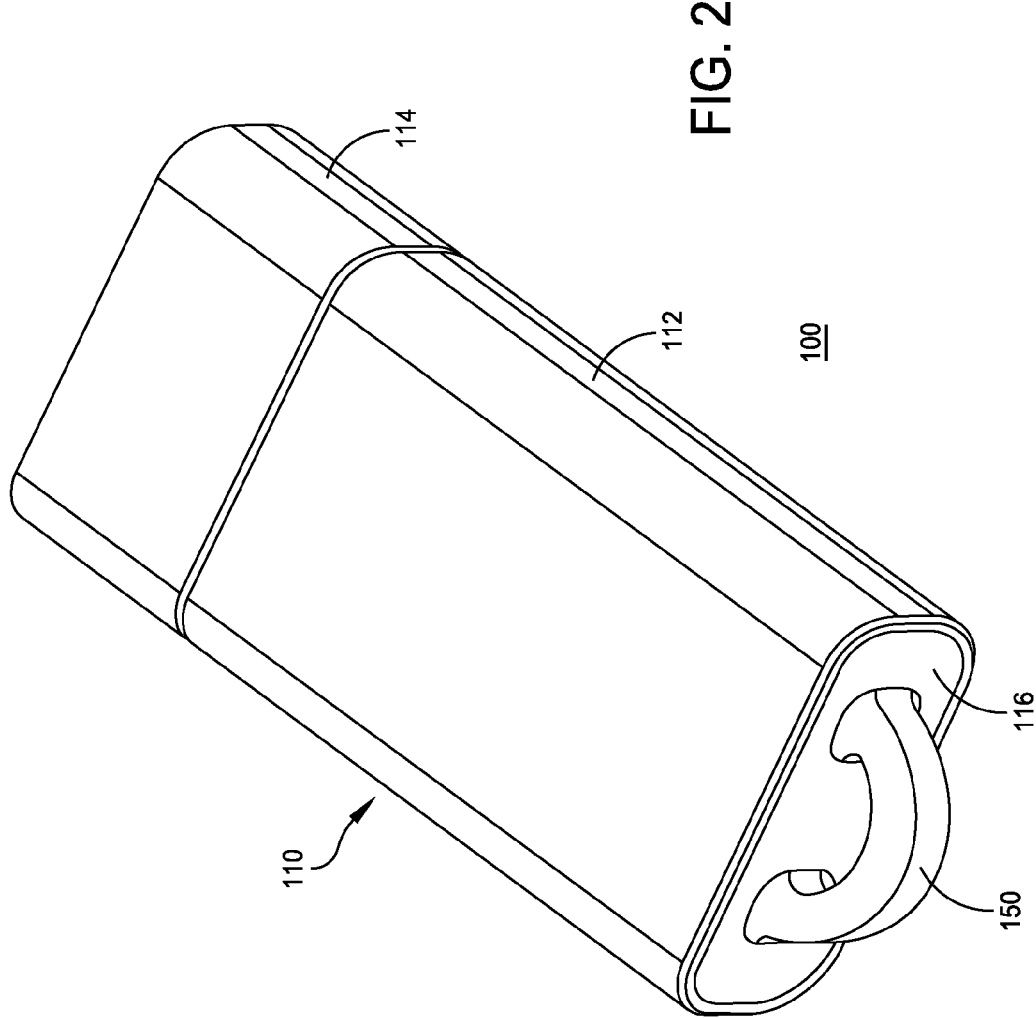
FIG. 2 is a rear perspective view of the key fob of FIG. 1.
Figure 3:
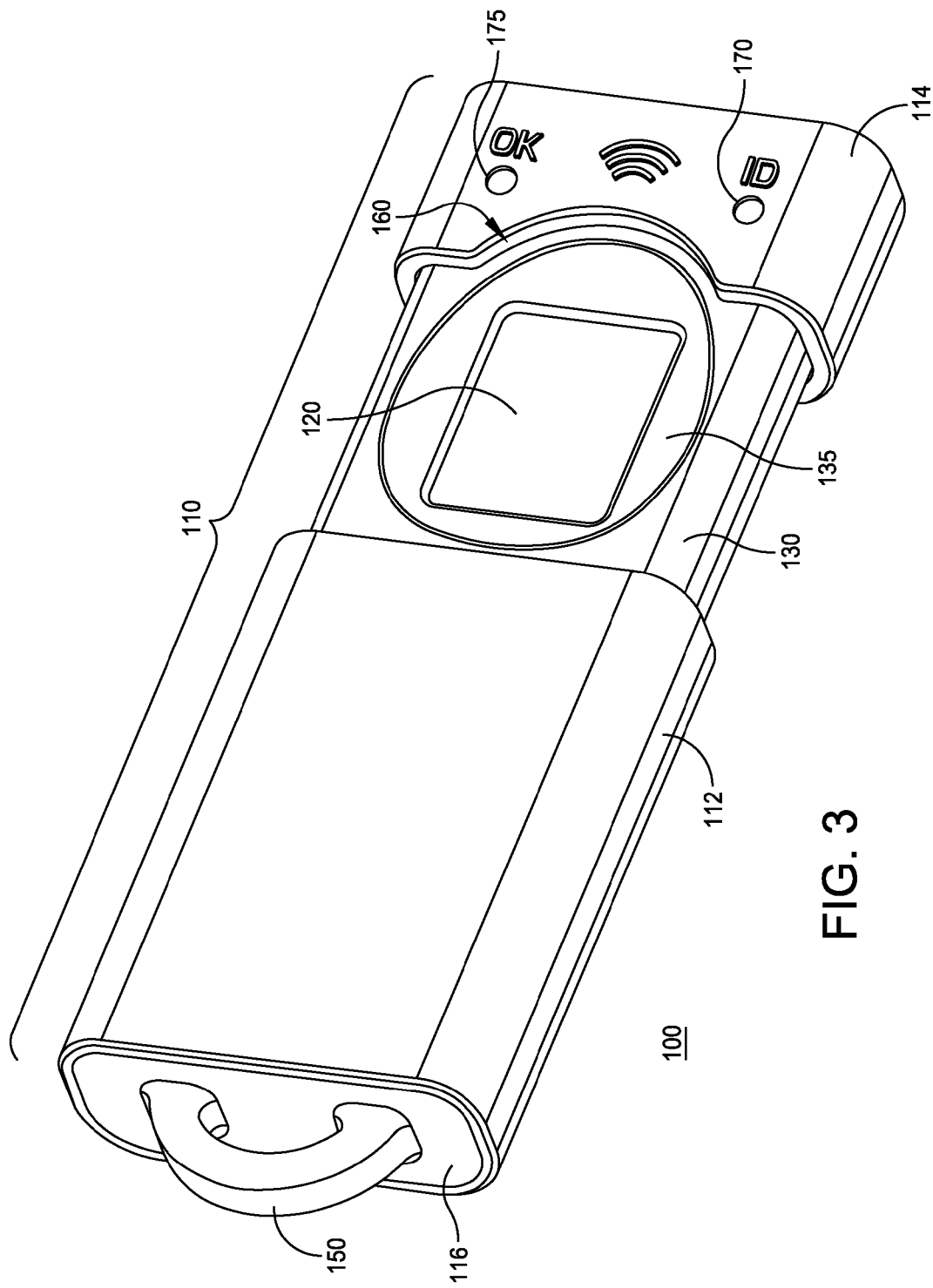
FIG. 3 is a front perspective view of the key fob of FIG. 1 shown in the open position.

FIG. 1 is a front perspective view of an embodiment of an exemplary key fob 100 having a built-in biometric (e.g., fingerprint) area sensor. FIG. 1 shows the key fob 100 in the "closed" or retracted position where the biometric sensor window of the key fob 100 is covered, thus protecting the sensor, as will be described in more detail below. FIG. 2 illustrates a rear perspective view of the key fob 100. Finally, FIG. 3 illustrates a front perspective view of the key fob 100 in the "open" or deployed position with the biometric sensor window exposed.

In embodiments, the key fob includes a biometric sensor such as a fingerprint area sensor, one or more processors (not shown in FIGS. 1-3) in communication with the biometric sensor for comparing biometric information obtained with the biometric sensor with stored biometric information for an individual, a transmitter, preferably a transceiver, for communicating stored transaction information to a reader under control of the processor, a power supply and a housing. FIGS. 1-3 principally illustrate the housing 110.

The housing 110 includes a base portion that supports the biometric sensor, power supply and control/processing components. The base is movably engaged with a sleeve to allow for selective exposure of the biometric sensor. In the embodiment illustrated in FIGS. 1-3, the base is slidably engaged with the sleeve so that when the base portion is slid out of the sleeve, the biometric sensor is exposed.

Figure 4C:
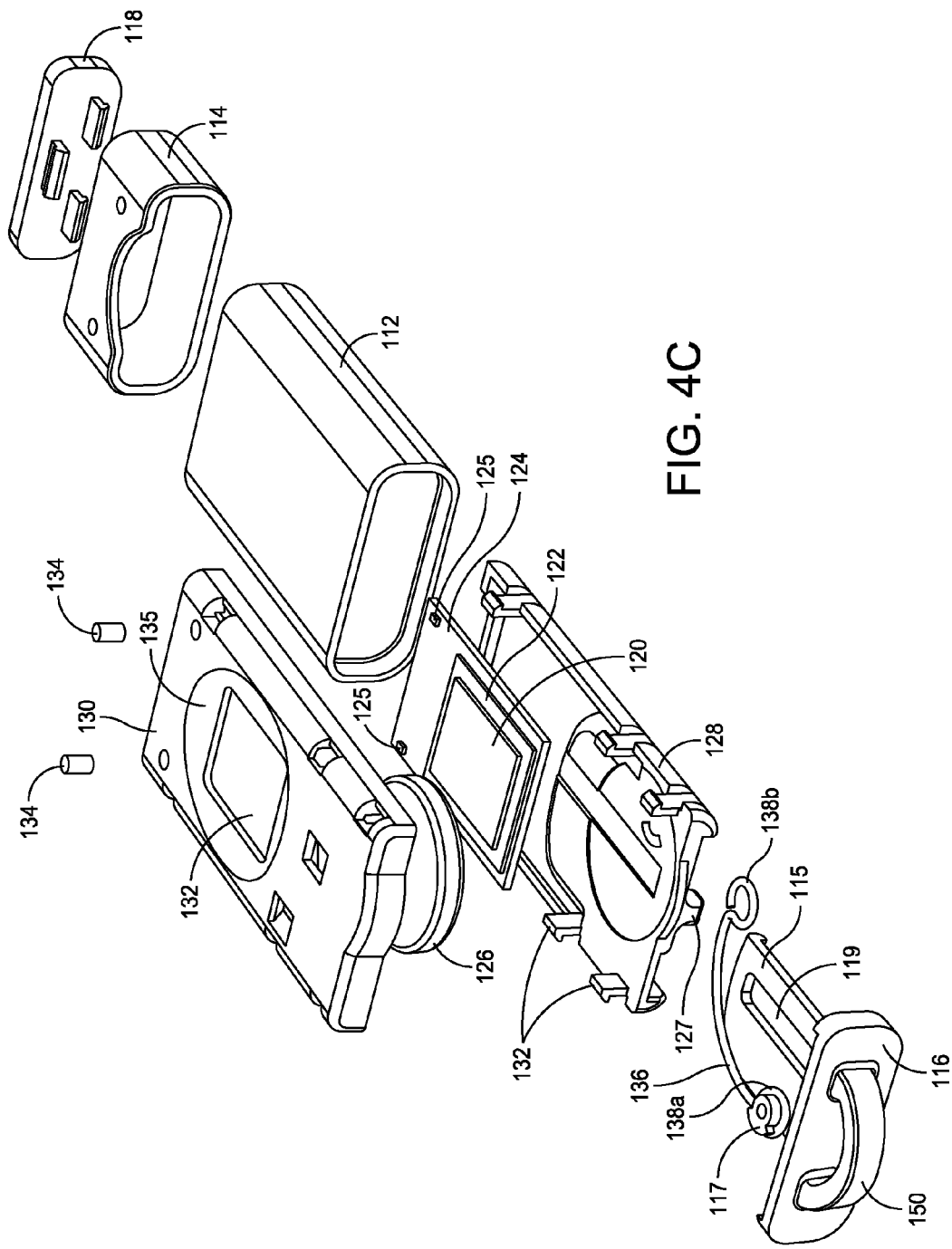
FIG. 4C is an exploded view of the key fob of FIG. 1.

FIGS. 4A and 4B are front and rear partial exploded assembly views, respectively, of the key fob 100. FIG. 4C is an exploded view of the key fob 100. Together, these views illustrate components of the housing 110 and the base portion in more detail.

Figure 9:
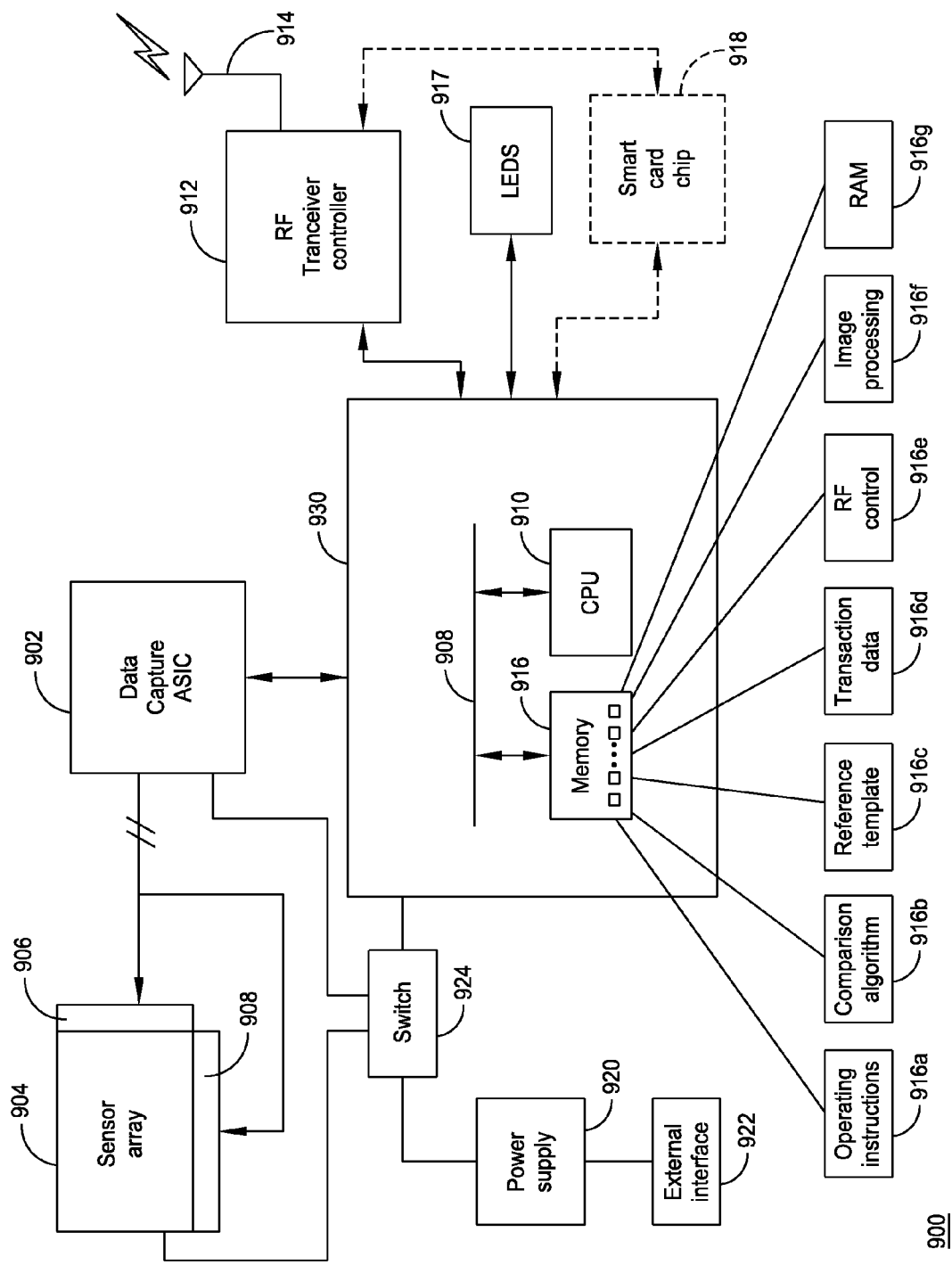
FIG. 9 is a block diagram of sensing, control and communication components of the key fob.

As can be seen from the figures, the housing 110 includes sleeve including a major lower sleeve portion 112 and a minor upper sleeve portion 114 as well as bottom and top end caps 116, 118, respectively. Together, these features cooperate to cover, house, support and protect the internal components of the key fob 100. A printed circuit board 124 has an area biometric sensor coupled thereto. The area biometric sensor comprises a substrate 122, such as a glass substrate, having a sensor array area 120, typically only a few microns thick, formed thereon. Examples of sensors of this type which may be utilized for the area biometric sensor are described in U.S. Pat. No. 6,091,837 to Dinh, entitled "Sensor for Acquiring a Fingerprint Image Based on Heat Transfer" (hereinafter "Dinh I") and U.S. Patent Application Publication No. 2008/0063246, also to Dinh, entitled "Apparatus for Fingerprint Sensing and Other Measurements" (hereinafter, "Dinh II"), the entirety of each of which is hereby incorporated by reference herein. Other components in FIG. 4C, not shown but described in more detail in connection with FIG. 9, are also provided on the PCB 124, including, for example, a data capture ASIC, a control processor chip, a smart card chip, and/or a transceiver controller chip. A battery 126 is seated on main rear cover 128 and electrically connected to the printed circuit board 124 by appropriate connections (not shown). Main front cover 130 fits over the main rear cover 128 and is secured thereto by snap connectors. Main front cover 130 has a window/opening that is sized to fit the sensor array area 120. Light pipes 134 couple light from LEDs 125 mounted on the printed circuit board 124. Collectively, the main front cover 130 and main rear cover 128 form a base that is slidably mounted within the housing, specifically within the lower sleeve 112.

A spring member 136, such as an arc, parabolic or bow-shaped spring similar to a leaf spring, is connected by a first female lasso end 138a to a male member, protrusion, stem or peg 117 that extends from a plate member 115 of the bottom cap 116. A second female lasso end 138b is coupled to a similar male member, protrusion, stem or peg 129 (FIG. 4B) extending from the bottom surface of the main rear cover 128.

The main rear cover 128 includes a guide protrusion 127 that engages a guide track 119 in the member 115 of the bottom cap 116. As best seen in FIGS. 4A and 4B, the base assembly, which includes the main rear cover 128 and main front cover 130, encloses components 120, 122 and 124 and battery 126. This completed base assembly is slidably engaged with the bottom cap 116 by engaging guide protrusion 127 with the guide track 119 of plate member 115. These components are also connected using spring member 136.

As best be seen in FIG. 3, once the bottom cap 116 is engaged with the base assembly (e.g., cover members 128, 130), sleeve 112 is slid over the base assembly and connected by interference fit (snap fit or other connection means) with or without an adhesive with bottom cap 116. Top cap 118 is fitted into upper sleeve 114, which is then fitted to the end of the base assembly. As can be seen from FIGS. 1 and 3, the combination of the base assembly and the upper sleeve 114/top cap 118 is slidable with respect to the bottom cap 116 and lower sleeve 112 to allow selective uncovering of the sensor area 120, which is exposed through window 132 once uncovered.

Figure 6B:
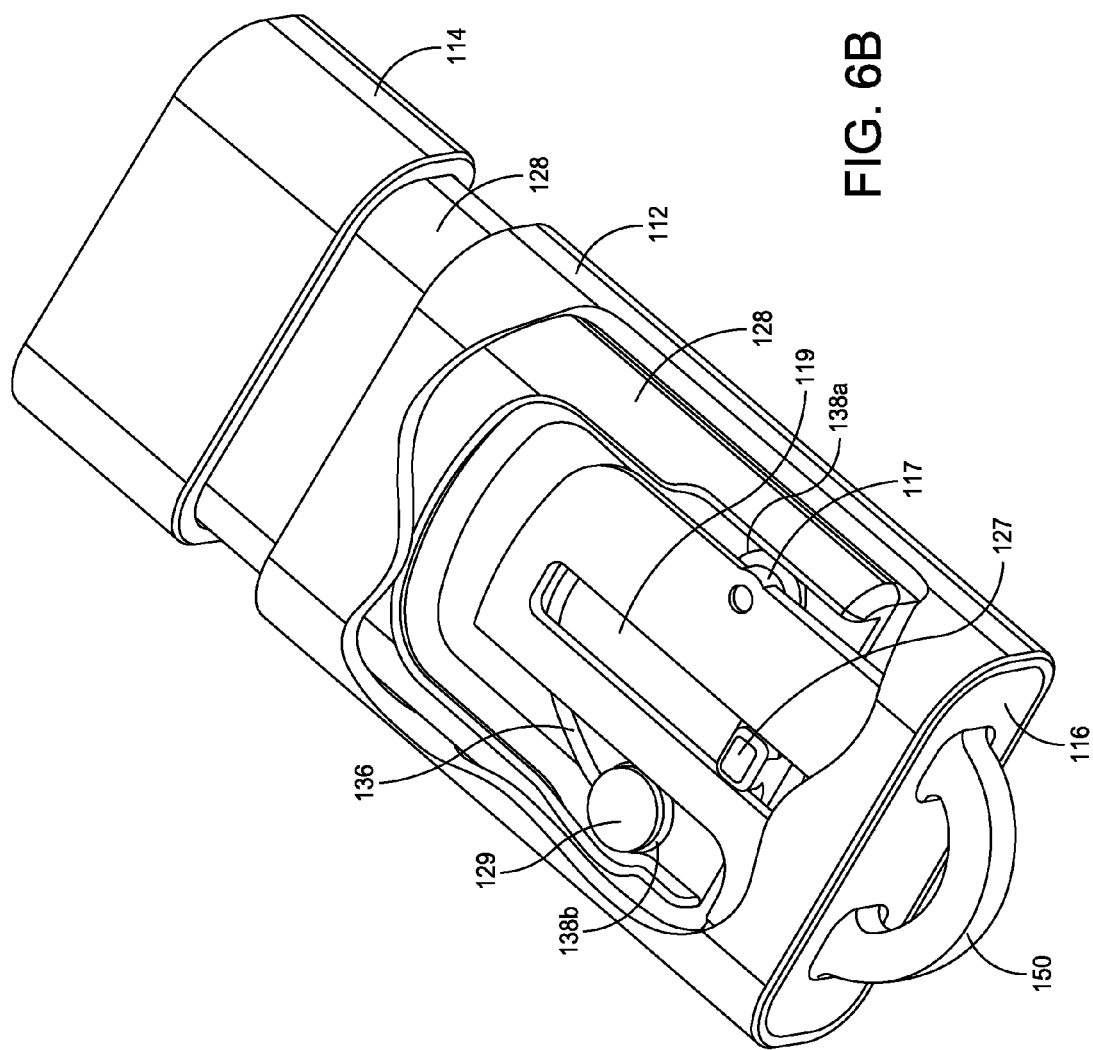
Figure 6D:
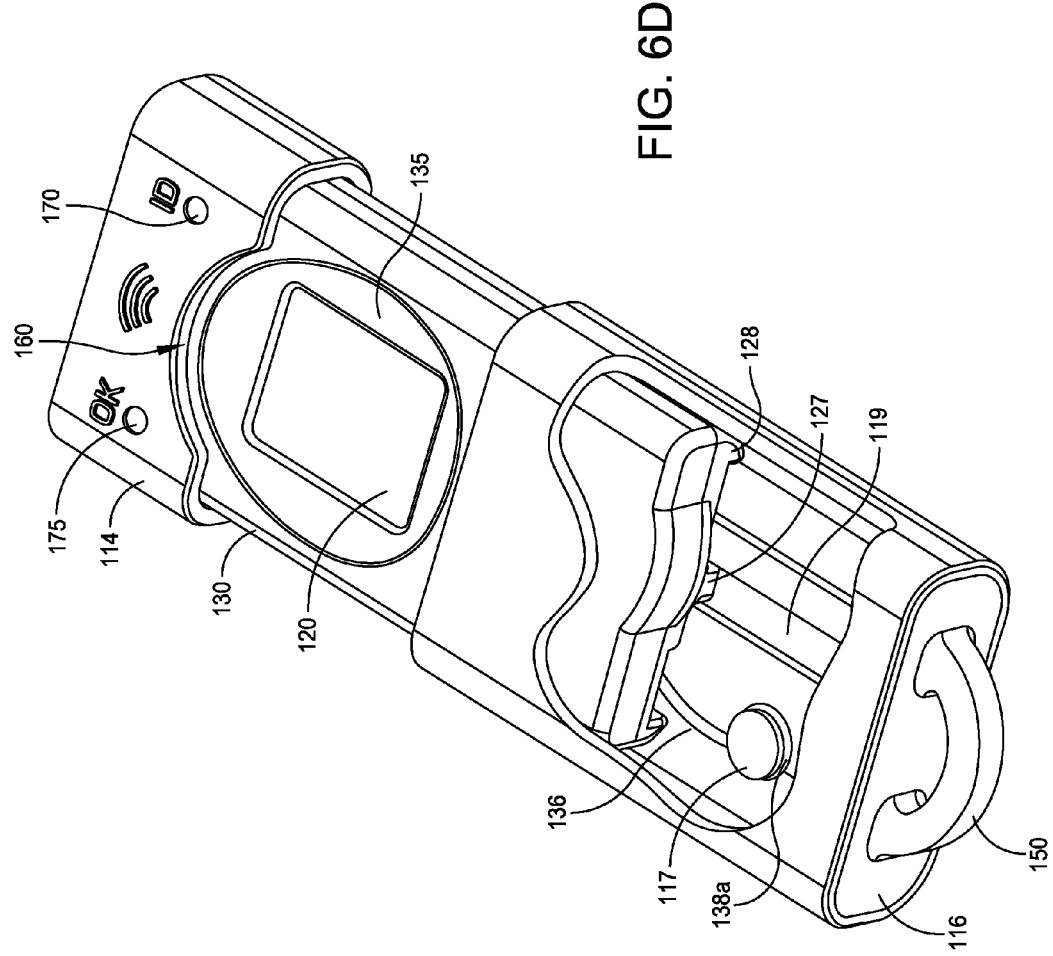

FIGS. 6A-6D are cut away perspective views illustrating in more detail the sliding engagement between the covering and the base of the housing 110 and the operation of the spring member 136. As can be seen from these figures, when in the closed position, the upper sleeve 114 is positioned adjacent the lower sleeve 112. The arc spring member 136, coupled between the peg 129 of the main rear cover 128 and the peg 117 of the bottom cap 116, is downwardly flexed and compressed between its anchor points, with end 138b extended past end 138a when the key fob 100 is in the closed position. As the base member is slid out from sleeve 112 with the guide protrusion 127 sliding along the guide track 119, the spring member 136 moves towards its quiescent position where the ends 138a, 138b are even with one another, as shown in FIG. 6B. In this position, the spring 136 is laterally compressed between its anchor points but stable, i.e., no more likely to flex in one direction (e.g., the closed position) versus another direction (e.g., the open position). Before reaching this quiescent state, the spring 136 operates to help keep the fob in the closed position by resisting further compression of the spring. Once the spring passes the position shown in FIG. 6B, the spring helps to push the fob towards the open position (as shown in FIG. 6C) as the spring decompresses from it maximum compression state (FIB. 6B). FIG. 6D is a front view showing the key fob 100 in the fully open position. The spring 136 will resist closing of the key fob 100 until the key fob is again manually closed into the position shown in FIG. 6B, where ends 138a and 138b are aligned. Thereafter, when pushed just past this position towards the fully closed position, the spring 136 will help move the device towards the fully closed position and, importantly, help keep the key fob in the closed position until sufficient external force is applied to open the key fob beyond the position shown in FIG. 6B.

Figure 5:
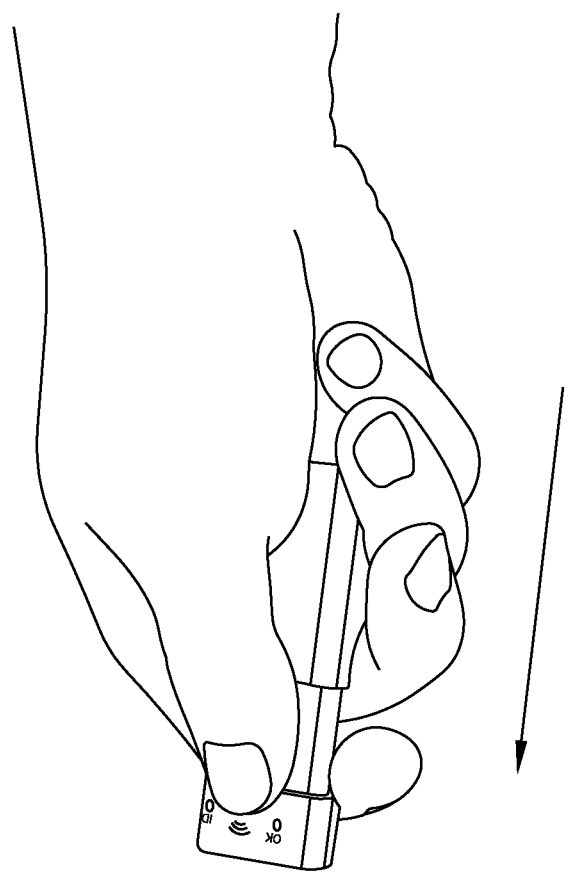
FIG. 5 is a view of the key fob of FIG. 1 in the open position and engaged by a user's thumb.

Various other features of the key fob 100 are now described. As shown in FIG. 1, the key fob 100 includes a loop 150 for connection to a key ring. Of more interest, the key fob upper sleeve 114 is designed to cooperate with the base 130 to form an arched ledge or step 160. As can also be seen in, for example, FIGS. 1, 3, 4A, 4C and 6D, the base 130 forms a thumb-shaped (preferably bowled) recessed seat 135. Alternatives or additionally, a protrusion or wall may be formed in or near the area of the ledge or step 160 against which a thumb tip can be pushed. These features cooperate to promote easy one-handed opening of the device and result in the proper placement of the thumb for scanning With reference to FIG. 5, with the key fob 100 in the closed position (e.g., FIG. 1), the user grips the device in the palm of the user's hand and positions the edge of the user's thumb at the step 160. The user then slides his or her thumb outward (in the direction of the arrow) and against the step or ledge 160, which causes the base 130 to slide out of the lower sleeve 112. Importantly, locating the thumb tip against the step 160 to open the device causes the thumb to be accurately and comfortably seated in the thumb seat 135, correctly positioned directly over the upper surface of the sensor area 120 as shown in FIG. 5 when the fob is in the fully open position.

The ability to open the key fob to expose the sensor in the manner described is an important aspect of the key fob disclosed herein. First, it allows in one movement both the opening of the device and, importantly, the correct and consistent placement of the user's finger over the sensor area, which facilitates consistent biometric performance. Second, the speed of use of the device is improved when compared to, for example, stripe sensors. Third, the manner of using the device is highly intuitive, as the opening motion is made in the direction of the transaction terminal with which the device will ultimately communicate (assuming successful biometric authentication).

The key fob is preferably of smaller dimensions than a typical cell phone. In embodiments, the key fob has a length in the closed position between about 5-8 cm, a length in the open (deployed) position between about 6-11 cm, a width of about 2.5-3.5 cm and a thickness of about 0.75-1.25 cm.

FIGS. 7A-7D illustrate an alternative embodiment of a key fob 200 that uses a spring clip 210 that assists in retaining the fob 200 in the closed position, assists in opening the fob 200, and assists in retaining the fob 200 in the open position once opened. FIG. 7A is a see-through view showing the fob 200 in the "closed" position. As with fob 100, the fob 200 includes a base 220 having a sensor window 225 that is disposed within a covering sleeve 230. The base 220 and sleeve 230 are slidably engaged with respect to one another.

The spring clip 210 is anchored within sleeve 230 in a suitable manner and includes two legs 212a, 212b. At a base portion 214, the legs 212a, 212b slope towards one another, narrowing the distance between the legs, until they reach a transition region 215. At the transition region 215, the legs 212a, 212b begin to slope away from one another, widening the distance between them. The legs terminate at a pair of cupped seat portions 218.

The spring clip 210 is anchored with respect to the lower sleeve 230. When in the closed position, the spring clip base portion 214 fits around at least one protrusion, for example a protruding bar or pair of spaced pegs 222 of the base 220. The pegs 222 include at least one peg and more preferably a pair of pegs as shown in the figures. This fitted relationship helps hold the base 220 securely within the sleeve 230 when the sensor is not in use, thus reducing the likelihood of inadvertent opening of the device, and offers some resistance against sliding the base 220 away from the sleeve 230.

As the base 220 is slid away from the lower end of the sleeve 230 by user actuation, the pegs 222 cam the legs of the base portion 214 away from each other. The pegs eventually reach the transition region 215 of the spring clip legs 212a, 212b as shown in FIG. 7B.

As shown in FIG. 7C, once the pegs 222 make it past the transition region 215, the ever-widening spacing between the legs 212a, 212b in section 216 offers decreasing resistance to moving the base 220 from the sleeve 230 and helps to facilitate opening of the key fob 200.

Finally, as shown in FIG. 7D, when in the fully extended position the seat portions 218 of the spring clip 210 snap into place around the pegs 22 and offer some initial resistance against closing the device (i.e., to help retain the fob in the open position). As will be understood, in closing the device (i.e., returning the base 220 into the sleeve 230, the spring 210 works in the opposite manner. That is, where the distance between the legs narrows, the spring clip 210 offers initial resistance against the progress of pegs 222 through region 216, towards transition region 215. Once pegs 222 are forced past transition region 215, the base region 214 facilitates movement of the pegs 222 to the seated position shown in FIG. 7A because the distance between the legs of the spring clip increases in base region 214 in the direction of movement.

FIG. 8 is a block diagram of one exemplary system in which the key fob described herein can be used. Operation of the key fob in the system is described in more detail below in connection with FIGS. 9 and 10. The system 800 is a credit transaction system and includes key fob 802, terminal 804, electronic point of sale (EPOS) terminal 806 (or electronic cash register), merchant server 808, acquirer host 810, bank net/regional network 812 and issuer host 814. The terminal 804, EPOS terminal 806, servers 808, 810, 814 and network 812 are conventional components of a credit transaction system used in the credit industry and need not be detailed herein. Briefly, these components operate to: (a) receive data from the key fob 802 for authorizing a credit transaction; (b) prompt for online PIN entry, if required; (c) send an authorization request message to the issuer via the acquirer; (d) receive approval or decline from the issuer in a response message; (e) record transaction data in a terminal log for use in clearing messages; (f) if required, print receipt; and (g) prompt for signature, if required.

FIG. 9 is a schematic block diagram of the area sensor, control and communication system 900 of an exemplary key fob described herein. As can be seen in FIG. 9, the system 900 includes a fingerprint area sensor array 904 and row and column selectors/decoders 906, 908 for selectively activating/powering the area sensor array 904 and reading information from the sensor array 904 under control of a data capture ASIC 902. Data capture ASIC 902 is responsible for activating the sensor array (which is a passive device), capturing signals therefrom, converting the signals from analog values to digital values, and providing the digital data representing the analog values array line-by-array line to the control processor 930.

In exemplary embodiments, the sensor array 904 operates on active principles. The most efficient and accurate sensing arrays are based on active principles. Active sensors quantify a specific physical parameter response to a given stimulus. For example, active thermal sensors measure an object's heat conductance for a given heating stimulus. Examples of sensors of this type which may be utilized for the fingerprint sensor array 904 are described in Dinh I and Dinh II, incorporated by reference above. The response to the stimulus is measured by each of the sensing sites (e.g., pixels) within the sensor array. The response is in part a function of the stimulus provided, i.e., the larger the stimulus, the larger the response. Various aspects of the sensor array and its connections with surrounding reading and powering addressing circuitry are also described in, for example, the following international patent applications: PCT/U.S.10/20091, filed Jan. 5, 2010 and published as WO 2010/080751 on Jul. 15, 2010, entitled "Low Noise Reading Architecture For Active Sensor Arrays"; PCT/U.S.09/63202, filed Nov. 4, 2009, and published as WO 2010/053938 on May 14, 2010, entitled "Non-Binary Decoder Architecture And Control Signal Logic For Reduced Circuit Complexity"; and PCT/U.S.09/63055, filed Nov. 3, 2009, and published as WO 2010/053894 on May 14, 2010, entitled "Voltage Reading Technique For Large Sensor Arrays Through Reduced Noise Differential Path", the entirety of each of which is hereby incorporated by reference herein.

As described in the aforementioned patents and applications, recent advances in lower cost semiconductor electronics, such as high performance polycrystalline silicon ("polysilicon") thin film transistors (TFTs), have enabled the implementation of accurate sensing arrays at a reduced cost. Use of this technology also provides the ability to integrate control circuitry such as row and column selectors/decoders 906, 908 on the same panel as the sensing array, further reducing cost and increasing integration levels.

Controller processor 930 can based on a special purpose processor such as the SYNOCHIP™ AS602 processor available from Hangzhou Synochip Technology Co., Ltd of China, which includes a RISC processor and applications for fingerprint image processing, comparison and authentication. Alternatively, the control processor 930 can be a generic processor programmed to run any number of known compact fingerprint algorithms in software. One exemplary generic processor is the STM32F103 processor available from ST Microelectronics of Geneva, Switzerland, which utilizes an ARM-based 32-bit MCU architecture. The control processor communicates with a RF transmitter, preferably a two-way RF transceiver 912, via conventional I/O means (not shown). RF transceiver may be a standalone transceiver controller chip coupled to an antenna 914. The antenna 914 may formed on the PCB substrate 124 but is more preferably disposed on or close to the outer surface of the key fob housing or embedded within the housing. Control processor 930 includes CPU 910 and ROM and RAM memory (shown together as memory 916) communicating via bus 908. As will be familiar to those of skill in the art of microprocessors, the CPU 910 controls the operation of the controller processor 930 in accordance with operating instructions 916a contained in memory 916. CPU 910 receives data from data capture ASIC 902, temporarily stores the data in RAM 916g, and uses image processing techniques (memory sector 916f) to enhance the fingerprint image, identify characteristic features and develop a fingerprint template for the presented finger (i.e., thumb). The CPU 910 compares the so-developed fingerprint template with a pre-stored reference template from memory sector 916c using the comparison algorithm in memory sector 916b. The CPU also has access to RF control instructions (memory sector 916e) for controlling RF transceiver 912 to communicate transaction data from memory sector 916d (e.g., user/ card data, cryptographic data for exchange with a contactless card reader, or other transaction data depending on the nature of the transaction) via antenna 914 for use in a transaction. The CPU 910 also communicates with other external devices, such as LEDs 917 for interfacing with the user.

A power supply 920 (e.g., battery) is shown for providing power to the various components illustrated in FIG. 9. The battery may be disposable or of the rechargeable variety. For example, the battery may be recharged via an external interface 922 such as a mini-USB interface. That USB interface can also serve as an external communication link to the one or more processors of the key fob in embodiments.

An optional smart card chip 918 (shown in dashed form) may also be provided in system 900. In such embodiments, the controller 930 is again responsible for receiving, storing and image processing data from the data capture ASIC 902. However, the control processor 930 provides the developed fingerprint template to the smart card chip 918, which performs an on-card biometric comparison, sometimes referred to as a match-on-chip or match-on-card operation, as is known in the art, to authenticate the user. Upon authentication, the smart card chip 918 controls the RF transceiver 912 to communicate transaction data to a reader in accordance with standard contactless smart card transaction protocols. In embodiments, the smart card chip may includes its own embedded transceiver. If smart card chip 918 has sufficient processing power, it could be configured to perform the control and image processing operations of the controller 930.

Figure 10:
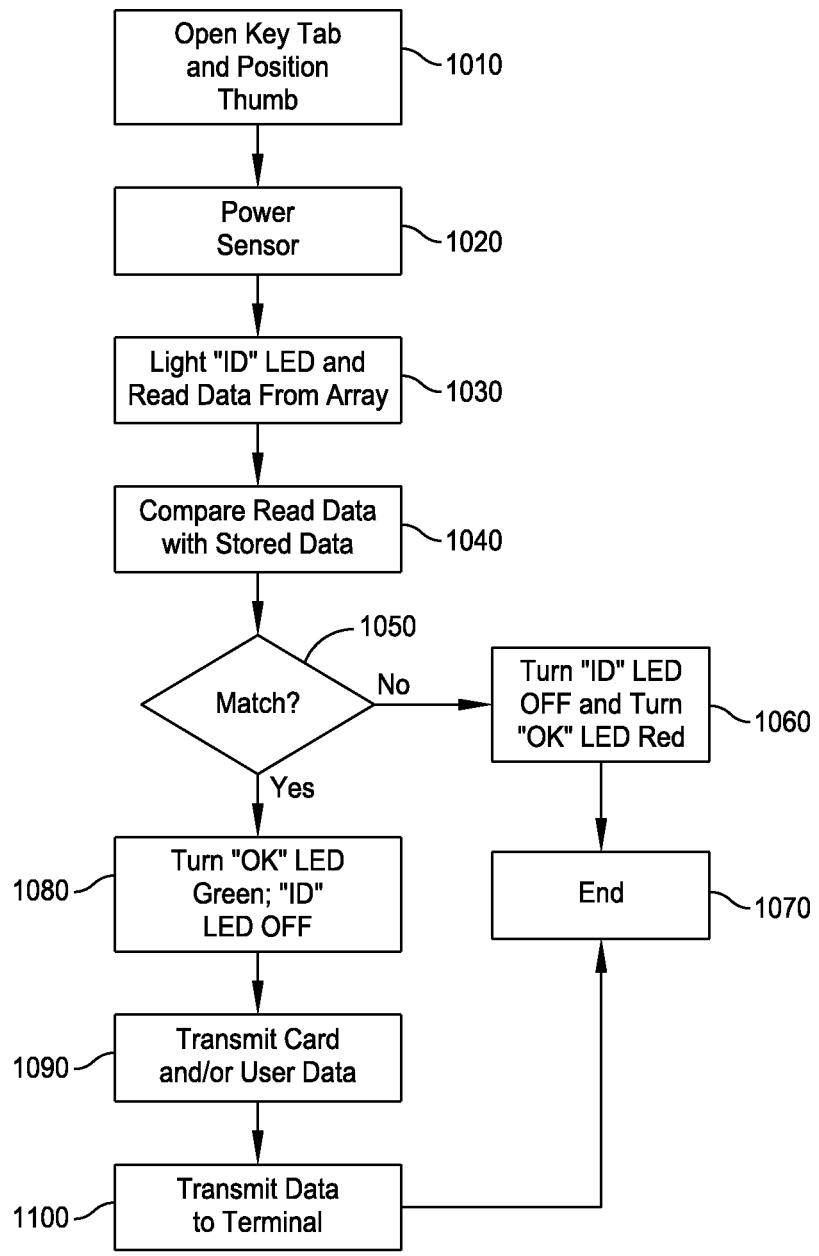
FIG. 10 is a flow diagram illustrating the operation of the key fob in initiating a transaction.

FIG. 10 is a flow diagram illustrating an exemplary operation method of the key fob.

At 1010, the process begins when the user approaches a terminal 804, and opens the key fob (via the simple, intuitive one-handed manner described above) to expose the fingerprint sensor and simultaneously properly positions a thumb on the fingerprint sensor. This action is preferably started before placing the key fob within the RF field of the terminal 804, as the user moves toward the terminal 804, so that the scan can commence, and preferably be completed, before entering the RF field.

At 1020, the fingerprint sensor array is powered so that the fingerprint can be sensed. In embodiments, the CPU is powered on/up when the key fob is activated by extending the housing. This may be implemented by electronic or mechanical switch (switch 924 in FIG. 9). Similarly, the key fob is powered off/down when closed. A standby mode may also be implemented with regular wake-ups for administrative tasks within the device. It may be possible to power the key fob component like the processor and biometric sensor using the RF field of the terminal 804, but more preferably these components are powered by a battery in the device as described above. Providing battery power allows for the authentication operation to begin and preferably be completed before the device is placed within the RF field.

At 1030, the ID LED 170 is lit and fingerprint data is read from the sensor array. The lit ID LED indicates to the user that the user's finger should be on the fingerprint sensor for fingerprint acquisition and that the authentication process is being performed.

At 1040, the fingerprint data read from the sensor array is compared against stored fingerprint data. More specifically, as discussed above, the fingerprint template is generated or developed using image processing techniques and compared to a pre-stored reference template.

At 1050, a determination is made as to whether the generated fingerprint template and the stored fingerprint reference template match.

At 1060, if the templates do not match, the ID LED 170 is turned off and the OK LED 175 is turned red, indicating to the user that the match was not successful. The process then ends at 1070.

At 1080, if a match is found, the OK LED 175 is turned green, indicating to the user that the match was successful. In addition to or instead of a visual indication of a successful match, an audible indication (e.g., beep or buzz) or even vibration may be employed.

At 1090, assuming the user has now moved the key fob into the RF field of the terminal 804, the key fob powers up the RF transceiver controller and provides any necessary transaction data (e.g., card and/or user identification data) to the transceiver controller for transmission to terminal 804 for use in the transaction. It should be understood that the exact nature of the communications between the key fob and terminal 804 depends on the nature of the transaction and the protocols applicable to the specific transaction. For example, there are known guidelines that govern communications for contactless credit card transactions and the cryptographic requirements thereof. The specifics of such communications do not form a part of the present invention and it should be understood that the device disclosed herein can be adapted to any transactional purpose to which it is employed.

At 1100, the key fob transmits the transaction data via the RF transceiver to the terminal 804. At step 1070, the process ends, at which time the user can close the key fob, which powers down the fob.

In exemplary embodiments, steps 1020 to 1080 preferably take one second or less. In this manner, the vast majority of the processing can be completed quickly as the user approaches the terminal, and the user is required to only briefly maintain the key fob in the RF field of the terminal (e.g., as by a quick pass through or tap motion) to execute the transaction.

Figure 11:
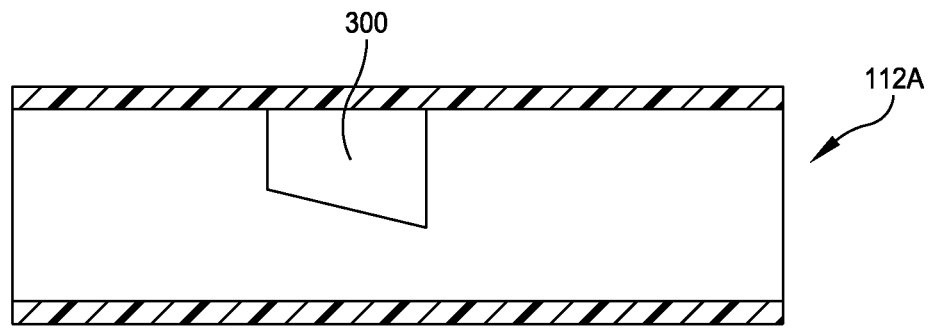
FIG. 11 is a cross-sectional view of an embodiment of the lower sleeve portion of the key fob cover having means for removing or obscuring latent images from the scanner window.

FIG. 11 is a cross-sectional view of an alternative embodiment of the lower sleeve 112A of key fob 100. In this embodiment, the lower sleeve 112A includes a latent image removal means 300 that depends from the upper interior surface of the sleeve 112A. The latent image removal means 300 engages the upper surface of the die 120 through window 132 when the device is slid closed to remove any latent fingerprint image from the die 120. Latent finger print images can remain on the die from oil and dirt, like a fingerprint is left at a crime scene. It may be possible to "lift" these images from the die surface. To further improve security, the latent image removal means 300 is positioned to wipe against the die surface when the device is slid closed in order to obscure (e.g., clean, smudge, etc.) all or part of any latent image that is left on the die surface, thereby rendering it useless if the key fob is lost or stolen. The latent image removal means can be sized to cover the entire width of the sensor area surface, or only part or parts of the sensor area sufficient to obscure any latent image. One exemplary material for the latent image removal means includes silicone though other materials suitable for this intended purpose may be employed.

Figure 12:
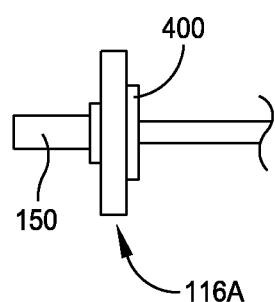
FIG. 12 is a partial side view of an embodiment of the bottom cap having a magnet for helping to secure the key fob in the closed position.

FIG. 12 is a partial side view of an alternative embodiment of the bottom cap 116A of the key fob 100 where the cap 116A has a magnet 400 for securing the key fob 100 in the closed position. In the illustrated embodiment, one or more magnets 400 are secured, such as by an adhesive or interference fit, on the interior surface of the bottom cap 116A. The main front cover 130 and/or main rear cover 128 is provided with a ferromagnetic material which is attracted to the magnet as the key fob is closed. In addition to or in lieu of the spring member 136, the magnet helps keep the key fob in the closed position until it is opened by the user.

Although described herein in connection with conducting transactions, such as credit or debit transactions, the uses of the key fob are not so limited and modifications for use with other types of transactions are contemplated. These modifications would typically involve only changes in the nature of the transaction data stored in data module 916d described above and, as necessary, the operating instructions 916a and/ or RF control 916e of memory 916. By way of illustrative examples only, the key fob may be used for access control for facilities, time and attendance functions, security, auctions, data access, computer access, account access, document control or other applications where quick, reliable authentication is desired for accessing some resource (tangible or intangible).

Although the invention has been described in terms of exemplary embodiments, it is not limited thereto. Rather, the appended claims should be construed broadly to include other variants and embodiments of the invention that may be made by those skilled in the art without departing from the scope and range of equivalents of the invention.

What is claimed is:

1. A key fob comprising:
   a biometric sensor comprising a fingerprint area sensor having a surface for receiving a finger;
   a controller, the controller comprising at least one processor configured to authenticate a user of the key fob based on biometric information obtained with the biometric sensor and stored biometric information for an individual;
   a RF transmitter for communicating stored transaction information to a reader upon authentication of the user;
   a housing, the housing comprising a base for supporting the biometric sensor and a cover sleeve slidably engaged with the base to allow for extension from and retraction into the sleeve by the base, thereby permitting selective exposure of the fingerprint area sensor under user actuation; and
   a bowed spring element for retaining the base in retracted and extended positions as selected by the user, the bowed spring element having a first end fixed with respect to the cover sleeve and a second end attached to the base, the second end moving with the base as the base is extended from and retracted into the sleeve.

2. The key fob of claim 1, wherein the housing comprises means for engaging a finger of an individual to facilitate one-handed movement of the base to an extended position by the user.

3. The key fob of claim 2, wherein the finger engaging means comprises a ledge for engaging a tip of a finger of the user.

4. The key fob of claim 3, wherein the ledge is arched for mating with a fingertip and positioned to locate the finger over the surface of the fingerprint area sensor when the base is in a fully extended position exposing the surface of the fingerprint area sensor.

5. The key fob of claim 4, wherein the base has a window through which the surface of the fingerprint area sensor is exposed, the base further comprising a recessed seat area around the window for seating the finger over the surface of the fingerprint area sensor.

6. The key fob of claim 1, wherein the housing comprises means for engaging a thumb of an individual to facilitate one-handed movement of the base to an extended position to expose the surface of fingerprint area sensor and for aligning the thumb over the sensor when the base is in a fully extended position.

7. The key fob of claim 1, further comprising a data acquisition ASIC coupled between the fingerprint area sensor and the controller, wherein the at least one processor of the controller is operable to process image data provided by the data acquisition ASIC into a fingerprint template, and compare the fingerprint template against a reference template to authenticate the user.

8. The key fob of claim 1, further comprising a data acquisition ASIC coupled between the fingerprint area sensor and the controller, wherein the at least one processor comprises a control processor and a smart card processor, wherein the control processor is operable to process image data provided by the data acquisition ASIC into a fingerprint template and provide the fingerprint template to the smart card processor, wherein the smart card processor is operable to perform a match-on-chip operation to authenticate the user, wherein the smart card processor is operable to control the RF transmitter for communicating the stored transaction information to the reader upon authentication of the user.

9. The key fob of claim 1, wherein the second end of the bowed spring element is disposed more proximate to a bottom end of the key fob than the first end of the bowed spring element when the base in in a fully retracted position, and the first end of the bowed spring element is more proximate the bottom end of the key fob than the second end of the bowed spring element when the base is in a fully extended position.

10. The key fob of claim 9, wherein the bowed spring element is configured to:
    offer resistance against moving the base from the retracted position towards the extended position when the second end of the bowed spring element is more proximate to the bottom end of the key fob than the first end of the bowed spring element,
    offer resistance against moving the base from the extended position towards the retracted position when the first end of the bowed spring element is more proximate to the bottom end of the key fob than the second end of the bowed spring element,
    offer assistance moving the base towards the extended position when the first end of the bowed spring element is more proximate to the bottom end of the key fob than the second end of the bowed spring element, and
    offer assistance moving the base towards the retracted position when the second end of the bowed spring element is more proximate to the bottom end of the key fob than the first end of the bowed spring element.

11. A key fob for use in smart card transactions, comprising:
    a finger print area sensor having a surface for receiving a finger;
    at least one processor configured to authenticate a user of the key fob based on biometric information obtained with the fingerprint area sensor and stored biometric information for an individual;
    an RF transceiver for communicating stored smart card information to an RF reader under control of the at least one processor upon authentication of the user and presence of the key fob in an RF field of the RF reader;
    a housing, the housing comprising a base for supporting the biometric sensor and a cover defining a cavity, the base being slidably engaged with respect to the cover so as to allow extension from and retraction into the cavity by the base; and
    a spring element coupled between the base and the cover, the spring element configured to help retain the base in a fully retracted position when the base is retracted within the cavity and to help retain the base in a fully extended position when the base is extended from the cavity,
    wherein the spring element includes a spring clip fixed within the cover sleeve and a pair of spaced protrusions disposed on the base for engaging opposite sides of the spring clip, the spring clip including a first portion shaped for engagement with the pair of spaced protrusions for retaining the base in the fully retracted position, a second portion shaped for engagement with the pair of spaced protrusions for retaining the base in the fully extended position, and a transition portion between the first and second portions.

12. The key fob of claim 11, wherein the transition portion includes first and second sub-portions, the first sub-portion being configured to offer resistance against moving the base from the fully retracted position towards the fully extended position and to offer assistance moving the base towards the fully retracted position from a first point intermediate the fully retracted and extended positions, the second sub-portion being configured to offer resistance against moving the base from the fully extended position towards the fully retracted position and to offer assistance moving the base towards the fully extended position from a second point intermediate the fully retracted and extended positions.

13. The key fob of claim 12, wherein the spring clip includes first and second arms having oppositely disposed elbows where the first and second sub-portions of the transition portion meet.

14. A key fob for use in smart card transactions, comprising:

a finger print area sensor having a surface for receiving a finger;

at least one processor configured to authenticate a user of the key fob based on biometric information obtained with the fingerprint area sensor and stored biometric information for an individual;

a battery;

an RF transceiver for communicating stored smart card information to an RF reader upon authentication of a user and presence of the key fob in an RF field of the RF reader; and a housing, the housing comprising:

a base, the base housing the fingerprint area sensor, the at least one processor, the battery and the RF transceiver, wherein the surface of the finger print area sensor is exposed through a window in an outer surface of the base; and a cover for the base, the cover comprising a major sleeve portion defining a cavity, the base being slidably engaged with respect to the major sleeve portion so as to allow extension from and retraction into the cavity by the base, whereby the surface of the fingerprint area sensor is covered by the major sleeve portion when the base is in a retracted position and exposed when the base is in an extended position, and a minor sleeve portion disposed over an end of the base proximate to the surface of the fingerprint area sensor, wherein the minor sleeve portion and the outer surface of the base cooperate to form a ledge positioned to engage a tip of a thumb of the user when the key fob is seated in a closed hand of the user, such that the user moves the base from the retracted to the extended position by pushing the user's thumb against the ledge and extending the user's thumb, wherein a portion of the base is exposed to a user's thumb tip when the base is in a fully retracted position with the fingerprint area sensor covered by the major sleeve portion.

15. The key fob of claim 14, wherein the ledge is positioned such that when the base is in a fully extended position the user's thumb is positioned on the surface of the area sensor.

16. The key fob of claim 15, wherein the ledge is curved to generally match the shape of a thumb tip.

17. The key fob of claim 15, wherein the upper surface of the base has a recessed seating area around the window for seating the user's thumb.

18. The key fob of claim 17, wherein the portion of the base exposed to a user's thumb tip includes a portion of the recessed seating area.

19. The key fob of claim 14, further comprising a loop for connection to a key ring at a bottom end of the key fob proximate said major sleeve portion and distal said minor sleeve portion.

20. The key fob of claim 14, wherein the minor sleeve portion is shaped to expose the portion of the base that is exposed to a user's thumb tip when the base is in a fully retracted position.

* * * * *